Patented Sept. 15, 1942

2,295,705

UNITED STATES PATENT OFFICE 2,295,705

PROCESS OF PREPARING TERPINE HYDRATE

Albert Weissenborn, Dessau, Germany; vested in the Alien Property Custodian

No Drawing. Application August 24, 1938, Serial No. 226,587

4 Claims. (Cl. 260—630)

The present invention relates to a process of preparing terpine hydrate.

Turpentine oil gives rise, as is known, to the formation of terpine hydrate when it is allowed to stand for several days with acid-containing water, the pinene contained in the parent material being transformed into terpine hydrate by addition of water.

In view of the long period of time required for the reaction and owing to the comparatively great sensitivity of the pinene, numerous by-products, such as terpines, dipentenes, limonenes and other oxidation and resinification products are formed, unless the reaction is carried out with exclusion of air.

In order to obtain a better distribution and consequently a quicker effect of the hydrating agent it has been proposed to make use of sawdust from firs; also in this case, however, the dilute acid must be caused to act for a fortnight. Another process of improving the above hydrating process and for accelerating the absorption of water, so as to complete it after 6 to 8 days, consists in very vigorously stirring the reaction mixture while introducing carbon dioxide or nitrogen. This process has, however, failed to yield satisfactory results when it is carried out on a commercial scale.

I have found that turpentine oil may, within a very short period of time, be transformed into terpine hydrate by means of a dilute acid, especially sulfuric acid, by adding an emulsifying agent active in an acid medium, for instance those disclosed in German Patent 605,973 or French Patent 823,454, to the turpentine oil, to the dilute acid or to both.

The following examples illustrate the invention, the parts being by weight:

1. 500 parts of turpentine oil are run slowly drop by drop (for instance within 2 to 3 hours), while stirring well, into 2000 parts of sulfuric acid of about 25 per cent. strength, the reaction mixture containing 5 to 10 parts of polyglycol-mono-octodecyl ether, polyglycol-mono-abietyl ether or polyglycol-mono-isooctylphenyl ether. During the introduction of the turpentine oil, the temperature is kept between about 10° C. and about 15° C., and rises during the course of the reaction to at most 30° C. to 35° C. The reaction mixture is further stirred for about 48 hours. It is then filtered with suction in order to remove the sulfuric acid and washed with a sodium carbonate solution and with water. 460 to 480 parts of terpine hydrate are thus obtained.

2. 500 parts of turpentine oil are gradually added, at about 10° C. to 12° C. while stirring well, to 2000 parts of nitric acid of 23 per cent. strength, while adding 10 parts of a dispersing agent according to Example 1. The temperature is slowly raised to 25° C. to 30° C. 440 parts of terpine hydrate may be separated after 36 hours.

3. The procedure is the same as indicated in Example 2, with the exception that the nitric acid used has a strength of 27 per cent. 460 parts of terpine hydrate are obtained after 36 hours.

4. 500 parts of turpentine oil are run slowly into 2000 parts of a mixture of dilute acids containing 15 per cent. of sulfuric acid and 10 per cent. of nitric acid, the reaction mixture containing about 10 parts of one of the above-named dispersing agents. 470 parts of terpine hydrate may be separated after 36 hours, whereas only about 335 to 350 parts of the hydrate are formed after 72 hours under the same conditions without addition of any dispersing agent.

The pure white terpine hydrate obtained according to the preceding examples after washing with a dilute solution of sodium carbonate melts at 119° C.

The invention is not limited to the specific details described for obvious modification may occur to a person skilled in the art. There may, for instance, be used other emulsifying agents.

Instead of sulfuric and nitric acid there may be used phosphoric acid, the concentration of all these acids varying to a lower or higher concentration than 25 per cent.

What I claim is:

1. The process of preparing terpine hydrate which comprises treating turpentine oil with dilute mineral acid selected from the group consisting of sulfuric, nitric and phosphoric acid in the presence of an emulsifying agent active in an acid medium selected from the group consisting of polyglycol ethers of a higher aliphatic alcohol, of abietyl alcohol and of an alkyl phenol.

2. The process of preparing terpine hydrate which comprises treating turpentine oil with dilute mineral acid selected from the group consisting of sulfuric, nitric and phosphoric acid in the presence of polyglycol-mono-octodecyl ether.

3. The process of preparing terpine hydrate which comprises treating turpentine oil with dilute mineral acid selected from the group consisting of sulfuric, nitric and phosphoric acid in the presence of polyglycol-mono-abietyl ether.

4. The process of preparing terpine hydrate which comprises treating turpentine oil with dilute mineral acid selected from the group consisting of sulfuric, nitric and phosphoric acid in the presence of polyglycol-mono-isooctylphenyl ether.

ALBERT WEISSENBORN.